Jan. 19, 1943. E. W. MILLER 2,308,891
METHOD AND APPARATUS FOR GEAR GENERATION
Filed April 5, 1939 5 Sheets-Sheet 3
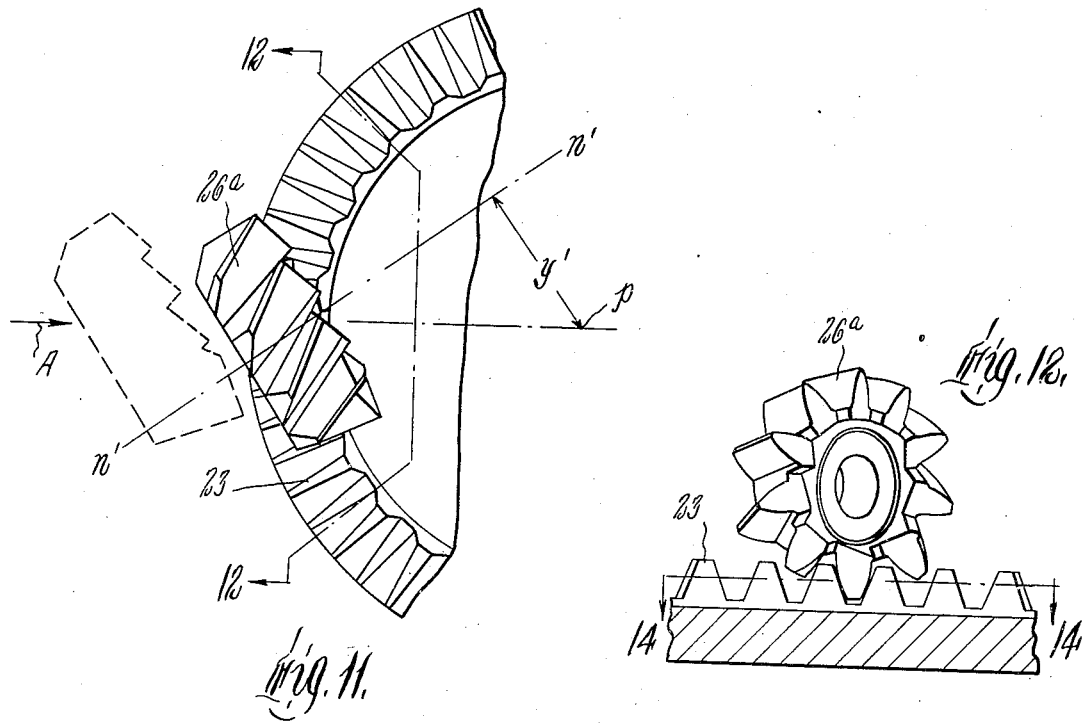
Fig. 11.
Fig. 12.
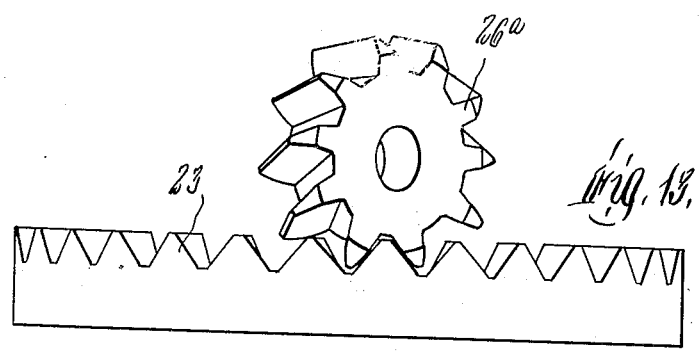
Fig. 13.
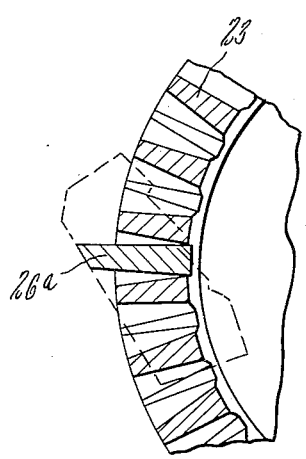
Fig. 14.
Inventor
Edward W. Miller
by Wright, Brown, Quinby & May
Attys.

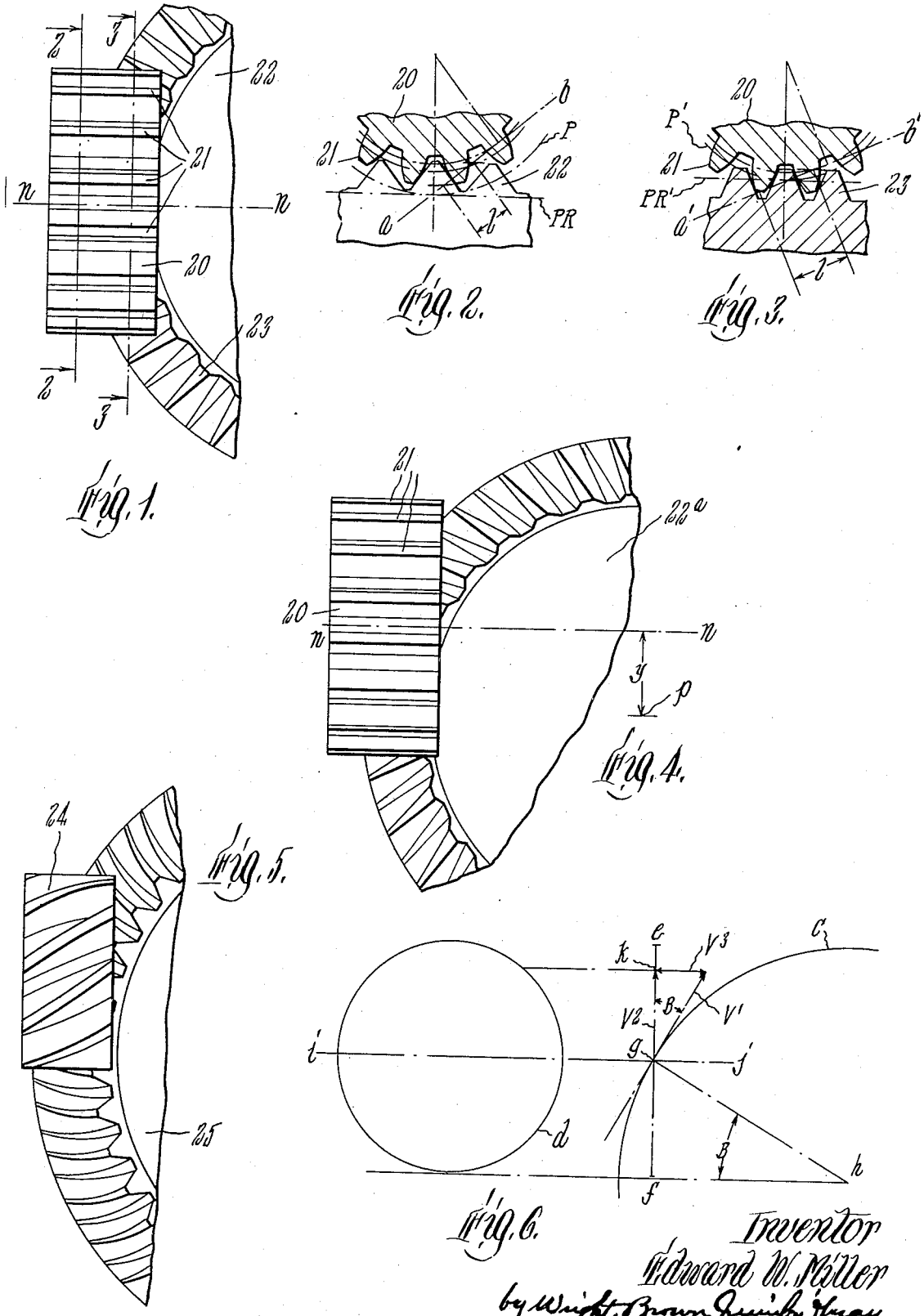

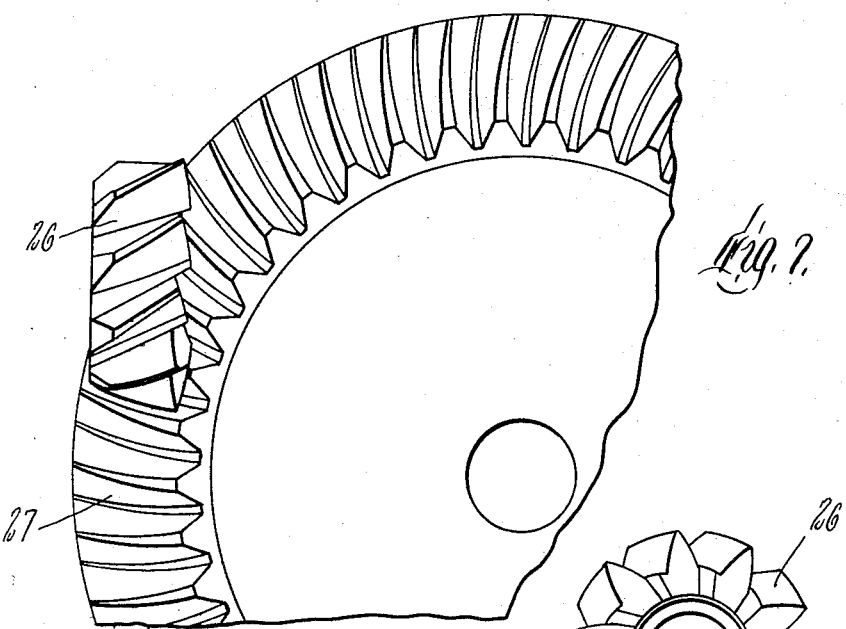
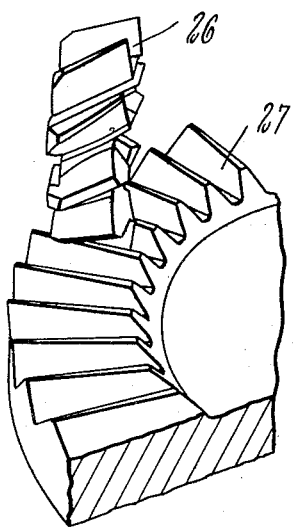
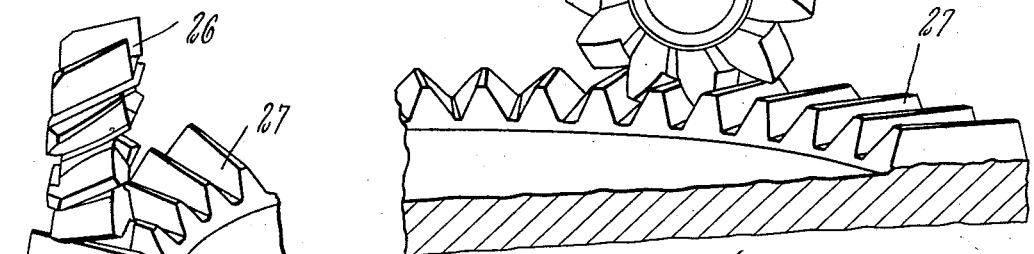
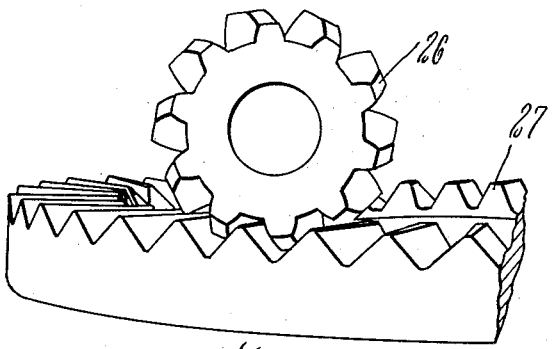

Jan. 19, 1943.   E. W. MILLER   2,308,891
METHOD AND APPARATUS FOR GEAR GENERATION
Filed April 5, 1939   5 Sheets-Sheet 4
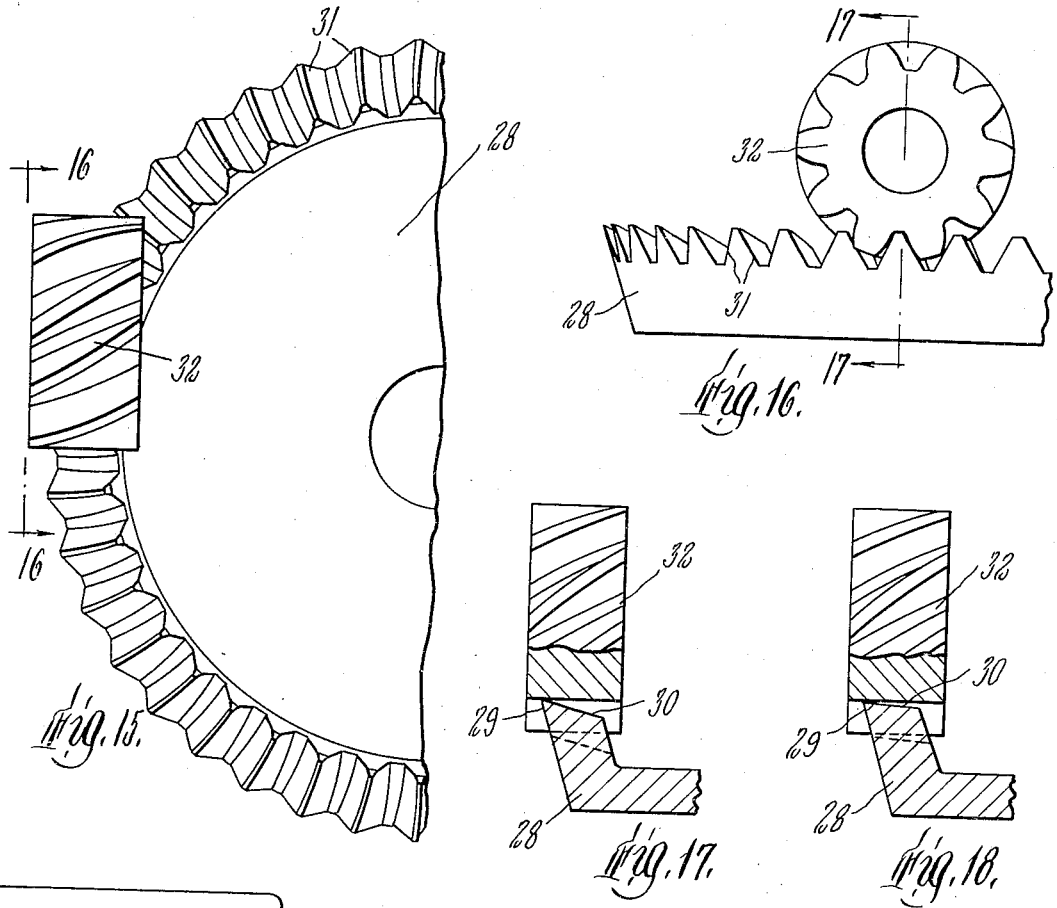
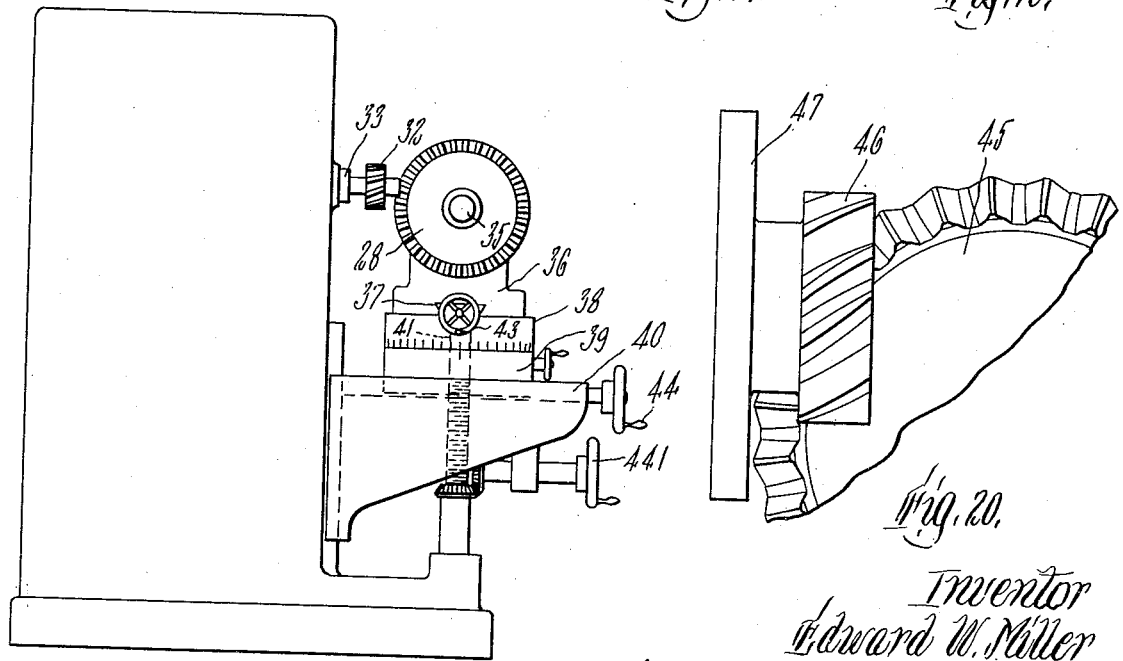
Inventor
Edward W. Miller
by Wright, Brown, Quinby & Hay
Attys.

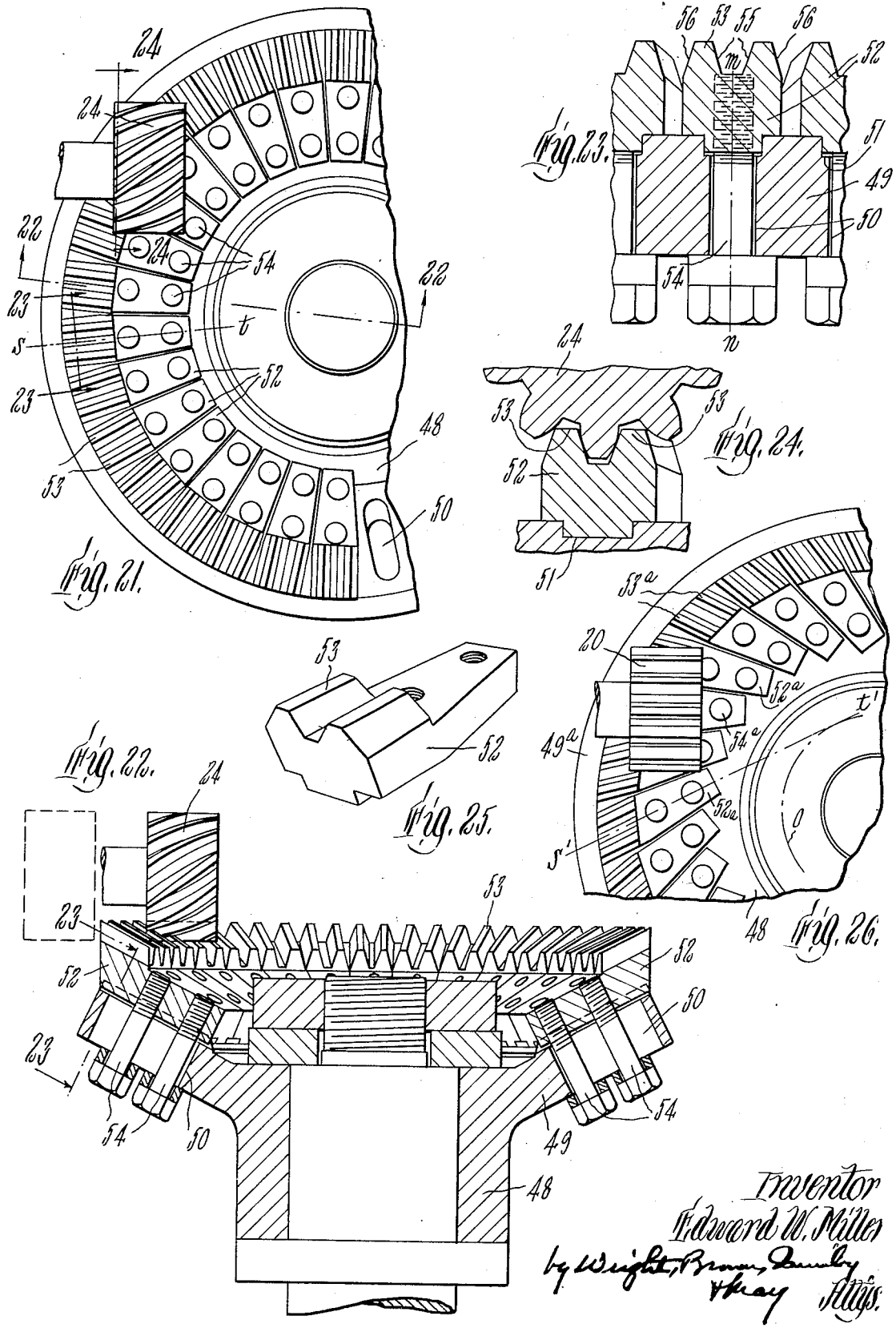

Patented Jan. 19, 1943

2,308,891

UNITED STATES PATENT OFFICE 2,308,891

METHOD AND APPARATUS FOR GEAR GENERATION

Edward W. Miller, Springfield, Vt., assignor to The Fellows Gear Shaper Company, Springfield, Vt., a corporation of Vermont Application April 5, 1939, Serial No. 266,112

24 Claims. (Cl. 90—7)

This invention relates to the art of generating and cutting gears and similar articles, including cutters adapted to be used for generating such articles. Within the meaning of the expression "gears and similar articles" as herein used, I include spur and helical gears, tapered or without taper, and face gears; and also other machine elements and articles characterized by a series of teeth or lobes and intermediate spaces, whether intended for the transmission of power by meshing engagement with conjugate teeth of a mating element, or for other purposes. I make this explanation so that it may be understood that, although the principal utility of the invention is concerned with the production of gears conforming with the common definition of that term, yet the invention is not limited to that specific purpose. In the following specification I shall generally refer to the object or work piece on which action is performed according to the invention as a gear, in the interest of brevity and to avoid constant repetition of the expression "and similar articles," or equivalent expressions. But it is to be understood that such references to gears only are to be construed as including all other articles or machine elements for the production of which the invention may be applied, except where the context necessitates a different construction.

The object and accomplishment of the invention have been to enable gears to be produced most rapidly. In accomplishing this result I have made use of a principle already known in the operation of face gear and pinion gearing where the axis of one member of the couple is offset from the other. The teeth of such a couple slip or slide lengthwise during their intermeshing travel. I have made use of essentially this same character of slip to produce a cutting action by a gear-like cutter of cylindrical character to generate face gears, and by a cutter of face gear characteristics to generate gears having a cylindrical form.

A face gear, within the meaning of that term as used in this specification, may be defined as one in which the teeth are formed in the end face of a ring or annulus (such, for instance, as an annular rib or zone on the face of a disk), and are conjugate to a spur or helical pinion or gear. One conspicuous difference between a face gear and a pinion or gear designed to mesh with it, is that the teeth of the face gear are located substantially in a plane perpendicular to the axis of the gear, whereas the teeth of the mating pinion or gear are located in a substantially cylindrical arrangement around the axis of such pinion or gear. Hence, when occasion arises in the following specification to apply a distinctive generic name to the gear which meshes with a face gear, or to the cutter used in generating a face gear in accordance with the present invention, I will refer to such gear or cutter as of cylindrical character. But the term "cylindrical" is not limited to a cylinder of uniform radius or to gears in which all of the teeth, or all points in the circumference of the gear, are at the same distance from the axis. For instance, tapered gears are included within this definition. Correspondingly the term "cylindrical cutter" hereinafter used means a cutter of which the teeth have an arrangement similar to that of a cylindrical gear within the meaning of the foregoing definition, (such as the familiar gear shaper cutters of the type described in the Fellows Patent 676,226 dated June 11, 1901); and the term "face cutter" means a cutter having teeth in an arrangement similar to the teeth of a face gear.

The particulars of the invention and the principles which it embodies are set forth in the following specification with reference to the drawings.

In the drawings—

Fig. 1 is a plan view of a meshing spur pinion and face gear couple designed to cooperate when their axes intersect;

Fig. 2 is a section of the pinion taken on a plane tangent to the outer circumference of the tooth bearing zone of the face gear, such plane being indicated by the line 2—2 of Fig. 1;

Fig. 3 is a section taken on a plane tangent to the inner circumference of the tooth bearing zone of the face gear, represented by the line 3—3 of Fig. 1;

Fig. 4 is a view like Fig. 1 of a similar couple conjugate to each other with their axes offset one from the other;

Fig. 5 is a view similar to Figs. 1 and 4 illustrating a helical pinion and face gear couple meshing with their axes offset;

Fig. 6 is a diagram illustrating the nature of slippage between the mating teeth of an offset gear couple of either type;

Fig. 7 is a view similar to Figs. 1, 4 and 5 showing the operation and result of generating a face gear by a helical gear shaper cutter in accordance with this invention;

Fig. 8 is a perspective view of the gear and cutter shown in Fig. 7;

Fig. 9 is a sectional perspective view showing the inner ends of the teeth of the same face gear;

Fig. 10 is a perspective view showing the outer ends of such teeth;

Fig. 11 is a view similar to Fig. 7 showing the application of the process for generating face gears adapted to mesh with companion gears without offset;

Fig. 12 is a sectional view taken on line 12—12 of Fig. 11 showing the cutter in projected elevation;

Fig. 13 is an elevation as seen from the left of Fig. 11;

Fig. 14 is a sectional view on line 14—14 of Fig. 12;

Fig. 15 is a view similar to Figs. 1, 4, 5 and 7 showing the operation and result of generating a cylindrical gear by a face cutter according to this invention;

Fig. 16 is a side view of the last named cutter and work piece as seen from the left of line 16—16 of Fig. 15;

Fig. 17 is a sectional view of the face cutter and work piece taken on line 17—17 of Fig. 16;

Fig. 18 is a view similar to Fig. 17 showing a modification in formation of the cutter teeth;

Fig. 19 is an elevation of a machine suitable for carrying out the method phase of this invention;

Fig. 20 is a view similar to Fig. 15 illustrating the utility of cutters of the type last described for cutting gears adjacent to a shoulder;

Fig. 21 is a view similar to Fig. 15 showing a cutter of face gear type having inserted teeth;

Fig. 22 is a section taken on line 22—22 of Fig. 21;

Fig. 23 is a fragmentary section of the cutter last described taken on line 23—23 of Fig. 21;

Fig. 24 is a section taken on line 24—24 of Fig 21;

Fig. 25 is a perspective view of one of the cutter elements of the complete cutter shown in Figs. 21 and 22;

Fig. 26 is a face view of a cutter with inserted teeth like that of Figs. 21-25, but designed for generating spur gears.

Like reference characters designate the same parts wherever they occur in all the figures.

The general characteristics of face gear and pinion couples are illustrated and described herein as an aid in explaining the principles of which use is made in carrying out the present invention. In Figs. 1, 2 and 3 a spur pinion or gear 20 having involute teeth 21 is shown as meshing with a face gear 22 in radial arrangement, that is, with its axis n—n intersecting the axis of the face gear at right angles. Conformably to the nature of spur gears, the teeth 21 of the pinion are parallel to the axis and of uniform shape and dimensions throughout their length. The forms of the face gear teeth 23 may be best appreciated by assuming that the zone or rib containing these teeth is of self-sustaining plastic substance while the pinion is of hard material, and that they are rotated in the manner of a pinion and gear couple at appropriate angular velocities. In said circumstances the pinion teeth mold conjugate teeth in the plastic substance radial to the face gear axis.

As points on the face gear more remote from the axis have a greater linear velocity than those nearer the axis, the nominal pitch lines of the pinion with respect to the gear are of greater diameters and the lines of action are at steeper inclinations to the plane of the gear in planes perpendicular to the axis of the pinion farther from the axis of the gear than in similar planes nearer to the gear axis. This condition is illustrated in Figs. 2 and 3 where P and PR represent the nominal pitch lines of the pinion and gear, and a—b represents the line of action, at the plane 2—2; and P', PR', and a'—b' represent the pitch lines and line of action at the plane 3—3. The length of action, designated by the dimension 1 in these figures is longer at the plane 3—3 (the inner end of the tooth portions between the planes 2—2 and 3—3) than at the outer end and both begins and ends at later points in the arc of rotation of the pinion. At intermediate points between said planes the angles of the lines of action and the lengths of action have intermediate values. Thus each tooth comes into and leaves contact with the mating tooth progressively from end to end. In gearing of other systems than the involute, the side face curvatures of the face gear teeth are different, but the general principles as to inclinations of the lines of action and length of action are the same as here described.

When the pinion is offset so that its axis does not intersect the face gear axis, but is perpendicular, or substantially so, to a line parallel to the latter axis, the same general conditions hold but the face gear teeth are modified in the length dimension. Fig. 4 shows an approximation of the form molded by the spur pinion 20 in a face gear 22a when the axis n—n of the pinion is offset a distance y from the axis p of the face gear. The longitudinal median lines of the face gear teeth are tangent to a circle of radius y circumscribed about the axis p; but the intersections of the teeth with all planes normal to their respective lengths (in the region where there is no tooth interference and undercutting) are straight lines, with slopes of progressively varying steepness, as in the case previously described.

Also a helical pinion, conceived as molding face gear teeth, will generate tooth curves of similar characteristics in normal sections, but with longitudinal curvature. Such curvature varies with the helicity of the pinion and the distance of its offset. Fig. 5 shows by way of illustration a face gear 25 conjugate to an offset helical pinion 24.

In the running of any offset face gear and pinion couple a slip takes place between the mating teeth in the direction of their length. The extent of such slip is proportional to the tangent of the angle of offset. This fact is demonstrated by the diagram in Fig. 6.

In this diagram the circular arc c represents the circumference concentric with the face gear at which the linear speed would be equal to the linear pitch line speed of a selected nominal pitch circle (corresponding, for example, to the pitch circle P' shown in Fig. 3) of an offset pinion d if such pinion were meshed with the gear in non-offset relation. This arc may be called, for the purpose of this explanation, the pitch circle of the gear. The line e, f represents the plane perpendicular to the axis of the pinion d which contains the pitch point g of the couple. Offsetting of the pinion may be considered, not only as a bodily displacement laterally from the plane established by intersecting axes, but also as an angular displacement, about the line parallel to the gear axis h which contains the point g, from the position where the pinion axis i, j is radial to the face gear. The angle B represents such angular displacement and is here referred to as the offset angle. A line is drawn tangent to the circle $c$ at the point $g$ and a length $V^1$ is laid off on this line from the point $g$ equal to the length of action on the pitch circle $c$. A line drawn parallel to the pinion axis $i, j$ from the outer extremity of the distance $V^1$ intersecting the line $e, f$ at $k$ determines the distance $V^2$, which is the length of action on the pitch circle of the pinion. The angle between the vectors $V^1$ and $V^2$ is equal to the offset angle B, and the length $V^3$ is the extent of slip. This is equal to $V^2$ tan B and also equal to $V^1$ sin B. Thus the extent of slip is directly proportional to a function of the angle of offset.

Such slippage is utilized according to this invention for cutting gears and the like by a continuous rotational movement, without reciprocation except for a slow feed movement, and without pauses for indexing. Either face gears may be thus cut by pinion type cutters, or external gears by face cutters.

For cutting face gears a cutter 26 of the type of the well known gear shaper cutter (see Figs. 7–10) is rotated about its axis and a gear blank 27 is simultaneously rotated about its geometrical axis located in offset relationship identical or similar to that above described except that the cutter is placed out of contact with the gear blank prior to commencement of the cutting action. Cutters of the type referred to are provided with circumferential teeth similar in arrangement to the teeth of a gear or pinion, either spur or helical, but differing in detail in that their teeth are made with cutting edges at one end while their side faces are inclined convergently away from the cutting end to provide cutting clearance. The cutter and blank, being simultaneously rotated at speeds inversely proportional to the number of cutter teeth and the number of teeth to be cut in the blank, are brought into cutting intersection at one circumference of the zone or rib of the gear blank in which teeth are to be cut. In this illustration it is assumed that the initial cutting engagement is at the outer circumference of this zone. But in some cases the cutting may be initiated at the inner circumference of the zone. A relative feed movement is produced between the cutter and gear blank across the face of the blank. Due to the simultaneous rotation and the slip above described, the cutter generates and cuts tooth forms in one margin of the tooth bearing zone, and as the feed progresses, such teeth are extended gradually to the other circumference of the zone.

While making the first passage the cutter is preferably set to cut to less than the full prescribed depth of the teeth. Thereafter the cutter is withdrawn, a depth feed between the cutter and work piece in the general direction of the axis of the latter is made, and one or more further cuts are taken. I have found that four successive cuts, with a depth feed after each cut except the last one, suffice in most instances to generate the teeth to full depth and width dimensions. However, the invention is not limited at all in respect to the number of cuts, which may be as many, and the depth of the successive cuts may be of any such amount, as is necessary or desirable to effect a desired result. The completed teeth have forms conjugate to a gear of which the teeth have the same pitch and pressure angle as the teeth of the cutter.

When a spur cutter is employed, and is fed in the direction of its axis, (corresponding to the axis $n$—$n$ of Fig. 4), with an offset $y$, teeth are generated in the face gear having a skewed arrangement of the same character as the teeth of gear 22a. When a helical cutter is used, also in offset arrangement, and fed in the direction of its axis, and is also given a twisting movement corresponding to the helical lead of its teeth in addition to its harmonius rotation, face gear teeth are generated conjugate to helical gears having the same lead as the cutter, illustrations of which are given in Figs. 5 and 7.

The harmonius rotation above referred to has reference to the rate and direction of rotation of the cutter in proportion to that of the gear blank. The number of teeth to be generated in the work piece and the number of teeth possessed by the cutter determine the speed ratio of these units, whatever the actual rotational speed of either unit may be. When the cutter is rotated at the proper speed determined by such ratio, and in the proper direction with respect to the direction in which the work piece rotates, it is considered for the purpose of this description to be rotating in harmony with the work piece. The helical twisting movement imposes an increment of rotation on such harmonius rotation, which may be in the same direction or the opposite direction, and in degree is equal to the circular component of the tooth helices of the cutter. It may be considered as a positive or a negative increment according as it is in the same direction as the harmonious cutter rotation or the opposite direction. The term "increment," and terms of like import, used in the claims are defined for the purposes of this disclosure as embracing negative increments (or decrements) as well as positive increments.

The invention is applicable further to generate face gears conjugate to gears in intersecting-axis relationship, i. e., those having teeth 23 substantially like the face gear teeth shown in Fig. 1. For this purpose a helical cutter 26a is mounted with its axis $n'$—$n'$ offset a distance $y'$ from the axis $p$ of the blank and is fed radially of the axis $p$, that is, for instance, in the direction of the arrow A shown in Fig. 11. The angle of offset is equal or approximately so to the helix angle of the cutter teeth and the direction of offset is that which causes the length of the cutter teeth to approximately coincide with the radius of the gear blank when at the mid point of their arc of cutting travel. The cutter is rotated in harmony with the work, so that the resultant motion of the cutting ends of its teeth, relatively to the work gear, is radial.

For generating gears of cylindrical character I use a cutter of face gear characteristics. One such cutter, shown at 28 in Figs. 15–18, is substantially like the face gear shown in Figs. 7–10, except that its teeth are not extended so far outward from the axis, and their side faces are relieved inwardly from the outer ends of the teeth to provide cutting clearance. Cutters of this type are made in accordance with this invention by the same procedure as previously described for generating face gears, with this additional detail that the path of cutting travel is inclined to the plane of rotation of the work piece sufficiently to obtain this cutting clearance. In cutting face gears, the cutting travel is usually parallel to the rotational plane of the work piece, (although not necessarily so), but in generating solid cutters with side clearance, the cutting travel is necessarily inclined at an acute angle.

The teeth may be provided also with an end rake 29 (formed by beveling the outer circumference of the cutter) and a top clearance 30. But the end rake is not essential, and the top clearance may be of any different value, as illustrated by Figs. 17 and 18. The intersections of the side faces with the outer end faces of these teeth constitute cutting edges 31. Such a tool when brought into cutting engagement with a cylindrical gear blank 32 in one or another of the offset-axis arrangements previously described, generates teeth in the gear blank. As in the case previously described, a relative feed movement axially of the work may be carried out during the cutting rotation and successive cuts may be taken after steps of a depth feed. Either helical or spur gears are then generated according as an incremental rotation is or is not imparted to the work in the course of the axial feed movement. Also helical gears may be generated by face type cutters with a feed travel radially of the cutter, in the converse of the operation described with respect to Figs. 11–14. In general, the cutting of cylindrical type gears and cutters by face type cutters is the converse or reversal of the cutting of face gears and face type cutters by cylindrical cutters.

In these cases also the slip due to offsetting of the work produces the cutting travel of the cutting edges. The tooth forms generated are conjugate to the cutting edges and are of uniform dimensions from end to end in cases where the feed during cutting is parallel to the axis of the work gear. If the feed is inclined to said axis, tapered teeth are generated. The finished gears are capable of meshing correctly with all conjugate gears of the same pitch and pressure angle however made.

It is not to be concluded from anything said in the preceding description that the cutting traverse is to be effected only by shifting of the position of the cylindrical member, whether such member is a cutter or a gear blank. This invention comprehends the accomplishment of such travel by movement bodily of either member alone or of both members simultaneously.

A typical machine capable of carrying out either phase of the method herein described is shown in Fig. 19. This machine possesses a rotatable spindle 33 having means of any suitable character adapted to support a work piece 32, or a pinion type cutter such as 26 or its equivalent. Such spindle is rotated and moved endwise by mechanism not shown, and is provided with guides of the character illustrated in the Fellows Patent 676,227, June 11, 1901, for controlling its rotation. Helical guides are used here to give the twisting or incremental rotation to work pieces and cutters of helical formation. The machine also includes a power driven spindle 35 adapted to carry the face type cutter 28, or equivalent cutter, or a face gear blank. Spindle 35 is mounted in a carriage 36 having sliding guided engagement by means of ways 37 with a turret 38 which in turn rests on a carriage 39 having sliding guided engagement with a bracket 40. The turret 38 is adjustable angularly about a vertical pivot 41 of which the axis intersects the axis of spindle 35. The guideways for the carriage 39 are parallel, and the ways 37 perpendicular, to the axis of spindle 33, but the ways 37 may be set at an oblique angle to spindle 33 by adjustment of the turret. The bracket 40 is vertically movable. Thus the cutter and work piece may be adjusted to any desired offset, and may be fed, one relatively to the other, longitudinally and crosswise of the spindle 33. I have indicated here, as means for effecting such horizontal and vertical movements, lead screws operable manually by cranks 43, 44 and 441, but it is within the scope of this invention to provide automatic driving means for these feed motions with automatic timing controls and adjustments for varying their rates of speed, as is well understood by machine builders. I have not shown the driving and speed correlating mechanisms for the spindles 33 and 35, but is will be understood that the driving means may be any usual driver, such as an electric motor, and that the driving trains from the motor to the respective spindles include changeable gears by which different speed ratios may be obtained.

By means of the adjustment afforded by the pivot 41, the teeth of face gears mounted on spindle 35 may be cut with a taper or side clearance and top rake, such as previously described and as indicated in Figs. 15–18, thereby producing elements which, after suitable heat treatment and sharpening, may be used as cutters. Conversely, cutters without side clearance in their teeth may be placed to have the effect of side clearance by suitably adjusting the turret 38. By appropriately combining the feed movements accomplished by the cranks 43, 44 and 441, or equivalent automatic means, the cutting traverse may be effected at various inclinations to the axis of the spindle 33, for producing the results hereinbefore described, including the generation of pinion type cutters with side clearance, and other results within the scope of the invention.

By the use of this invention accurate gears may be produced rapidly. The cutter and work piece may be rotated at very high speed and the longitudinal feed, (i. e., that lengthwise of the spindle 33), although slow in proportion to the rate of rotation, is nevertheless carried out in automatic operation rapidly enough to make the total time of gear generation very short in comparison with other methods. There is no time loss due to pauses for indexing, and the number of cutting traverses and steps of the depth feed is small in proportion to the number of teeth cut. But it is possible to cut to full depth in one traverse, which makes unnecessary any pauses for intermediate steps of depth feeding and return to starting point for successive traverses. However, when maximum life of the cutter is an important consideration, it is preferable to take a succession of comparatively light cuts rather than to perform the whole operation, or the roughing out operation, in a single heavy cut.

The accuracy of the result is at least as great as that of any other gear generating process, and greater than some. No more than a light final shaving, grinding or lapping action is needed to bring gears and cutters so made to the highest possible perfection of accuracy and finish. For many purposes gears made by the process here described are sufficiently accurate and have sufficiently smooth surfaces to need no further finishing treatment.

It hardly needs saying that the cutters herein described are made of materials or alloys of suitable composition for cutting tools and are treated and sharpened in known manner suitably for the purpose they are designed to serve. Face type cutters like that shown in Figs. 15–18 may be sharpened after dulling in use, by grinding away the outer circumference. They are made initially with their teeth extending far enough from the axis to provide for repeated sharpenings, and their cutting edges have slopes and spacing characteristic of the outer portion of face gears as explained hereinbefore with reference to Figs. 2 and 3.

The face type cutters of this invention have the advantage of ability to cut gears which are associated with a flange or shoulder from which they are separated by only a narrow recess. Thus, as shown in Fig. 20, such a cutter 45 is able to cut a helical gear 46 made integral with a closely adjacent shoulder 47 of larger diameter than the gear.

It is not essential that the teeth of cutters of this type be integral, and in Figs. 21-26 I have shown cutters with inserted teeth. The head 48 of the cutter shown in Figs. 21-24, which is designed to generate helical pinions and gears, such as the pinion 24, has a dished encircling flange 49 in the concave face of which are guideways 51 and through which there are radial slots 50. Cutter units 52, each having two teeth 53, are fitted to the guideways and secured, each by two bolts 54 passing through the adjacent slot into threaded engagement with the unit and clamping engagement with the under side of the flange. The teeth of each cutter unit are parallel to the median line $s$—$t$ of the unit, which line is radial to the cutter head. Hence the individual teeth are non-radial and the contiguous ones of adjacent units are sharply inclined to one another. However, the outer ends of all teeth are spaced equidistant from one another on a circumference coaxial with the cutter head; and, in order to avoid interference of their sides with the work when cutting to full depth, since they are not tapered, they are given enough top and side clearance for the purpose by the slope of the dished flange 49 on which they are secured. The faces 55 and 56 at the inner and outer sides of the teeth respectively, (that is, the sides nearer to and more remote from the median line or plane $s$—$t$), have different pressure angles in compensation for their departures from the radial relation to the cutter head, so that all cutting edges will generate symmetrical tooth face curves in the work piece.

A cutter with inserted teeth, like that of Figs. 21-24, except that it is designed for generating spur gears, such as the pinion 20, is shown in Fig. 26. The only different feature of this cutter is that the medial lines or planes $s'$—$t'$ of its cutter units 52a are tangent to a circle o, concentric with the cutter axis. In other words, they are skewed or inclined to the radii of the cutter head on which they are respectively located. Such inclination is sufficient, in conjunction with the top rake due to the dished formation of the cutter head flange 49a, to effect clearance between the sides of the cutter teeth 53a and the work gear teeth. The slots in flange 49a, corresponding to the slots 50, and the guideways corresponding to 51 are inclined similarly to the median lines $s'$—$t'$.

The cutters of the inserted tooth type are likewise sharpened by grinding away the ends of the teeth and when sharpened, the teeth are moved outwardly to the original circumference, as permitted by the slots 50 and clamping bolts 54. This capacity for adjustment has the advantage that the original shape and spacing of the cutting edges is preserved or renewed with each sharpening throughout the useful life of the cutter units. That is because the outlines and dimensions of each tooth are the same in all planes normal to the length of the tooth, whereby the edges resharpened by grinding remain of the same outlines as originally. And the outward adjustment of the ground ends to the original circumference preserves the original spacing between contiguous teeth of adjacent units.

Although these cutter heads are shown as having a full complement of teeth, this is not an essential detail. Each cutter unit, or some of them, may have a single tooth only if desired, and some units may be omitted altogether without destroying the effectiveness of the tool or departing from the invention. As the work and cutter are both driven by power at a prescribed speed ratio, the cutter will operate successfully in spite of missing teeth, provided only the teeth provided are suitably located to cut all of the prescribed spaces in the work.

The inclination of the teeth shown in Fig. 22 is not a limiting factor and may be of any value sufficient to avoid interference with the work. The outer end edges of the teeth are the only parts which actually engage the work. The inner parts merely support the cutting edges and provide a reserve of material from which to create new cutting edges when those previously in use have been worn away. However, the upper surface of the flange 49 and complemental under surfaces of the cutters must be such as to bring the newly formed cutting edges into the same locations as the original edges when the cutters are readjusted after sharpening, or sharpened after outward adjustment. Within these limitations, the top clearance angle may be varied more or less widely. It will be noted that the teeth in Fig. 22 have no end rake such as is shown in Fig. 17. That is, the bounding surface in which the cutting ends lie is parallel with the axis of the head. But they may be made with such an end rake if desired. On the other hand, the ends may be beveled in the opposite manner so as to make the angle at the point of the tooth less acute. From these observations it will be evident that I am not restricted to the details shown in the drawings and that many variations may be made therefrom without departing from the invention and from the scope of protection claimed.

What I claim and desire to secure by Letters Patent is:

1. The method of generating gears which consists in bringing a gear cutter and a gear blank, one of which has face gear characteristics and the other cylindrical gear characteristics, into the relationship of a cylindrical gear and face gear couple with offset axes, simultaneously rotating them about their respective axes, and effecting relative translative movement in the direction of the axis of the member of cylindrical character while maintaining a constant offset between their axes.

2. The method of gear generation which consists in providing a cutter and a gear blank, one of which is of cylindrical and the other is of face gear character and of which the cutter teeth have cutting edges on one end, mounting said cutter and blank with their axes in offset relationship and each transverse to the other axis, simultaneously rotating the cutter and blank about their respective axes at a speed ratio proportional to the ratio between the number of teeth in the cutter and the number of teeth to be generated in the blank, and bringing the cutter and blank together in cutting relationship from a position of relative separation in the direction of the axis of the cylindrical gear element while maintaining said offset relationship constant.

3. The method of gear generation which consists in providing a cutter and a gear blank, one of which is of cylindrical and the other is of face gear character and of which the cutter teeth have cutting edges on one end, mounting said cutter and blank with their axes in offset relationship and each axis transverse to the other in positions of separation from which the axial projection of the outer circumference of the member of cylindrical character intersects the tooth zone of the member of face gear character, rotating said cutter and blank about their respective axes at speeds proportional to the respective numbers of teeth, and effecting a relative travel between them in a straight path crossing the peripheral zone of the member of face gear character without change in said offset relationship.

4. The method of generating gears which consists in mounting a member of cylindrical gear character and a member of face gear character, one of which is a cutter having cutting edges at the ends of its teeth and the other is a gear blank, in a relationship approximately that of a cylindrical gear and a face gear meshed together with their axes offset, rotating said members at harmonious relative speeds, and effecting relative cutting traverse in the direction of the axis of said member of cylindrical gear character while maintaining the same offset between the axes.

5. The method of generating gears which consists in mounting a member of cylindrical gear character and a member of face gear character, one of which is a cutter having cutting edges at the ends of its teeth and the other is a gear blank, in a relationship approximately that of a cylindrical gear and face gear meshed together with their axes offset, rotating said members at harmonious relative speeds, and effecting relative cutting traverse across the margin of the face gear member radially thereof while maintaining constant the offset between said axes.

6. The method of generating gears which consists in mounting a member of cylindrical gear character and a member of face gear character, one of which is a cutter having cutting edges at the ends of its teeth and the other is a gear blank, in a relationship approximating that of a cylindrical gear and face gear meshed together with their axes offset, rotating said members at harmonious relative speeds, effecting relative cutting traverse in the direction of the axis of said member of cylindrical gear character, while maintaining constant the offset between said axes, and repeating such cutting traverse after effecting an increment of depth feed in a direction transverse to said axis.

7. The method of generating gears which consists in mounting a member of cylindrical gear character and a member of face gear character, one of which is a cutter having cutting edges at the ends of its teeth and the other is a gear blank, in a relationship approximating that of a cylindrical gear and face gear meshed together with their axes offset, rotating said members at harmonious relative speeds, effecting relative cutting traverse across the margin of the member of face gear character radially thereof, in a straight path while maintaining constant the offset between said axes, and repeating such cutting traverse after effecting an increment of depth feed in the direction of the axis of the member of face gear character.

8. The method of generating gears which consists in mounting a member of cylindrical gear character and a member of face gear character, one of which is a cutter having cutting edges at the ends of its teeth and the other is a gear blank, in a relationship approximating that of a cylindrical gear and face gear meshed together with their axes offset, rotating said members at harmonious relative speeds, effecting relative cutting traverse in a direction transverse to the axis of said member of face gear character, in a straight path while maintaining constant the offset between said axes, and imparting an incremental angular movement about its axis to the member of cylindrical gear character in the course of said cutting traverse.

9. The method of generating face gears, cutters of face gear character and the like, which consists in mounting a face gear blank and a gear shaper cutter of cylindrical character in substantially the relationship of a cylindrical gear and face gear couple with their axes offset from one another, but with the cutter displaced along the line of the aftermentioned relative travel from that part of the blank in which the teeth are to be cut, rotating said blank and cutter about their respective axes at a speed ratio proportional to the ratio between the number of teeth of the cutter and the number of teeth to be cut in the work, and effecting a relative travel between such cutter and blank in a direction transverse to the axis of the blank in a straight path without change in the offset between said axes such that the cutter teeth intersect the margin of the gear blank and perform a cutting action by virtue of the slip due to the offset relationship of said axes.

10. The method of generating face gears as set forth in claim 9, and comprising further the steps of effecting relative withdrawal between the cutter and gear blank, effecting an increment of depth feed between the cutter and blank in the direction of the axis of the blank, and again effecting relative cutting traverse between the cutter and blank.

11. The method of generating and cutting face gears conjugate to helical gears of cylindrical character, which consists in mounting a helical gear shaper cutter and a face gear blank in relationship similar to that of a cylindrical gear and face gear couple with their axes offset, except that they are displaced from engagement one with the other, rotating said cutter and blank about their respective axes at a speed ratio proportional to the number of teeth of the cutter and the number of teeth to be cut in the blank, effecting relative cutting traverse between the cutter and blank axially of the latter in a straight path without change in the offset between said axes which causes the cutter teeth to enter the tooth zone of the blank, and simultaneously giving a twisting movement to the cutter about its own axis corresponding to the helices of its teeth.

12. The method of generating and cutting face gear type cutters, which consists in mounting a helical gear shaper cutter and a cutter blank with their axes offset and the axis of the cutter at an oblique angle to a plane containing the axis of the blank, rotating said cutter and blank about their respective axes at a speed ratio in harmony with the ratio of the number of teeth of the cutter to the number of teeth to be cut in the blank, and effecting relative cutting traverse between the cutter and blank in said plane while maintaining said oblique angle always the same.

13. The method of cutting gears of cylindrical character which consists in providing a cutter of face gear character, having cutting edges on the outer ends of its teeth and having cutting clearance back from such ends, mounting said cutter and a gear blank rotatably with their axes offset and each substantially perpendicular to a line parallel to the other, rotating the cutter and blank about their respective axes at speeds in harmony with the ratio between the number of teeth of the cutter and the number of teeth to be cut, and simultaneously effecting a relative cutting traverse between the cutter and blank in a direction transverse to the axis of the cutter and in a straight path, without change in the offset between said axes which brings the circumference of the blank progressively in its axial direction into intersecting relation with the teeth of the cutter.

14. The method of generating gears according to claim 13 and including further the steps of effecting withdrawal between the blank and cutter after the first traverse, effecting a relative depth feed between the cutter and blank in the direction of the axis of the cutter, and effecting a repetition of such cutting traverse.

15. The method of generating helical gears which comprises the steps set forth in claim 13 and the further step of imparting an incremental angular movement to the gear blank in the course of its cutting traverse.

16. The method of cutting helical gears which comprises the steps set forth in claim 13 and the further steps of imparting an incremental angular movement about its axis to the blank during the course of such traverse, effecting withdrawal between the cutter and blank, giving a depth feeding movement in the direction of the axis of the cutter, and repeating the cutting traverse with the incremental angular movement of the blank.

17. A gear generating cutter consisting of a disk having teeth of face gear characteristics with cutting edges at their outer ends and being arranged to afford cutting clearance at their sides back from such ends.

18. A gear generating cutter comprising a cutter head and cutter units mounted thereon in an arrangement similar to that of the teeth of a face gear with provision for adjustment toward and away from the circumference of the head, in lines lying in a concave surface of revolution surrounding the axis of the head, said cutter units having cutting edges at their outer ends and having an outline and spacing at such outer ends corresponding to the teeth of a face gear.

19. A gear generating cutter comprising a cutter head having a concave dished face surrounding its axis and cutter units mounted thereon with provision for adjustment toward and away from the circumference of the head, said cutter units having cutting edges at their outer ends and being of uniform shape and dimensions in all planes normal to their length.

20. A machine for generating gears according to the foregoing process comprising a supporting structure, a holder adapted to carry a work piece or a cutter rotatably mounted on said supporting structure, a carriage slidably mounted on said supporting structure to move in a path parallel to said single, a second holder adapted to carry a cutter or a work piece rotatably mounted in said carriage and extending with its axis of rotation crossing the first named holder but at one side thereof, a cutter having teeth similar in characteristics to the teeth of a face gear with cutting edges on their outer ends and clearance inwardly from such ends, means for rotating the holders at relative speeds inversely proportional to the number of teeth of the cutter and the number of teeth to be generated, and means for imparting a traversing movement to said carriage.

21. A gear generating cutter comprising a cutter head having an outwardly flaring dished face surrounding its axis, and cutter units secured to said face, having teeth, the length dimensions of which extend inwardly from the circumference of said face, and the intersections of the outer ends and the side faces of which form cutting edges.

22. A gear generating cutter comprising a cutter head having an outwardly flaring dished face surrounding its axis, and cutter units secured to said face, having teeth, the length dimensions of which extend inwardly from the circumference of said face, and the intersections of the outer ends and the side faces of which form cutting edges, said teeth being of uniform shape and dimensions in all planes normal to their length dimensions and being secured to the head with capability for adjustment outwardly from the center of the head to permit sharpening and to maintain their cutting edges at the same distance from the axis after repeated sharpenings.

23. A gear generating cutter consisting of a disk having teeth in an arrangement similar to that of the teeth of a face gear, but having cutting edges at the intersections of their side faces and outer end faces, and their side faces being inclined to afford cutting clearance when the teeth are brought into cutting relationship to a work piece.

24. A gear generating cutter consisting of a disk having teeth on one side in an arrangement similar to that of the teeth of a face gear, with cutting edges at their outer ends, said teeth having side faces inclined toward each other inwardly from the cutting ends to provide cutting clearance.

EDWARD W. MILLER.